(12) United States Patent
Hyatt

(10) Patent No.: US 9,062,701 B2
(45) Date of Patent: Jun. 23, 2015

(54) PITCH DIAMETER SHANK BOLT WITH SHEAR SLEEVE

(75) Inventor: Thomas B. Hyatt, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 15 days.

(21) Appl. No.: 13/595,377

(22) Filed: Aug. 27, 2012

(65) Prior Publication Data

US 2014/0056667 A1 Feb. 27, 2014

(51) Int. Cl.
*F16B 35/04* (2006.01)
*F16B 19/02* (2006.01)

(52) U.S. Cl.
CPC ............... *F16B 19/02* (2013.01); *F16B 35/041* (2013.01)

(58) Field of Classification Search
CPC ..... F16B 5/0258; F16B 5/0283; F16B 35/041
USPC .................. 411/383, 385, 424, 353
See application file for complete search history.

(56) References Cited

U.S. PATENT DOCUMENTS

| | | | | |
|---|---|---|---|---|
| 2,460,613 A | * | 2/1949 | Whelan et al. | 292/251 |
| 3,296,694 A | * | 1/1967 | De Mastry et al. | 29/520 |
| 3,835,615 A | * | 9/1974 | King, Jr. | 403/408.1 |
| 3,946,636 A | | 3/1976 | Grey | |
| 4,020,735 A | | 5/1977 | Herback | |
| 4,472,088 A | | 9/1984 | Martin | |
| 4,730,966 A | | 3/1988 | Schiefer | |
| 4,818,163 A | | 4/1989 | Bereiter et al. | |
| 4,869,632 A | * | 9/1989 | Radtke | 411/55 |
| 5,018,920 A | | 5/1991 | Speakman | |
| 5,104,141 A | * | 4/1992 | Grove et al. | 280/86.753 |
| 5,338,139 A | * | 8/1994 | Swanstrom | 411/353 |
| 6,030,161 A | * | 2/2000 | Udell et al. | 411/353 |
| 7,229,061 B2 | * | 6/2007 | Battig et al. | 248/677 |
| 7,347,189 B2 | * | 3/2008 | Anello et al. | 123/470 |
| 2002/0009350 A1 | * | 1/2002 | Radtke | 411/353 |
| 2005/0008449 A1 | * | 1/2005 | Horita | 411/383 |
| 2010/0003105 A1 | | 1/2010 | Timmermann | |

* cited by examiner

*Primary Examiner* — Flemming Saether
(74) *Attorney, Agent, or Firm* — Carlson, Gaskey & Olds, P.C.

(57) ABSTRACT

A fastener includes a fastening portion including a head, a threaded portion having a first diameter, and a shank having a second diameter that is less than the first diameter. The shank is located between the head and the threaded portion. A sleeve surrounds the shank. The sleeve and the shank are uncoupled.

16 Claims, 3 Drawing Sheets

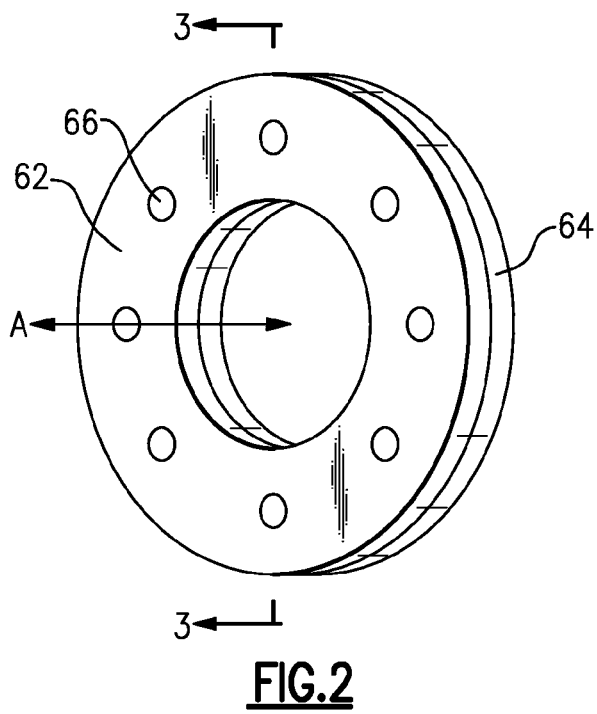
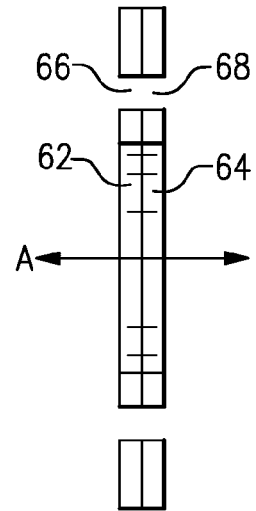
FIG.2
FIG.3
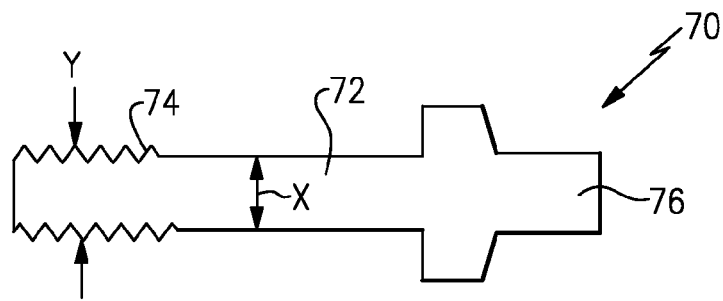
FIG.4
Prior Art
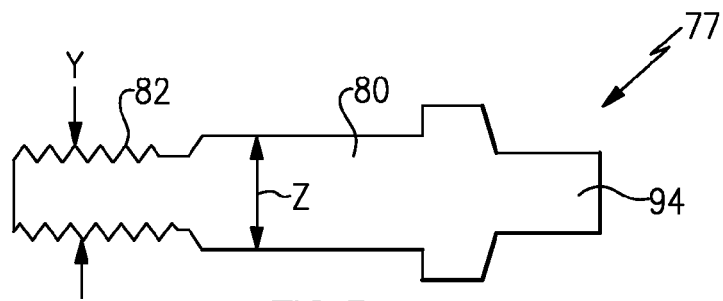
FIG.5
Prior Art

PITCH DIAMETER SHANK BOLT WITH SHEAR SLEEVE

BACKGROUND OF THE INVENTION

Bolts are employed to secure two components together. A pitch diameter shank bolt includes a shank that has a smaller diameter than a shank of a full shank bolt. A pitch diameter shank bolt can stretch more than a full shank bolt, allowing for a better stack-to-bolt stiffness ratio and an improved joint performance.

An outer diameter of a threaded portion of the pitch diameter shank bolt is larger than the diameter of the shank. The threaded portion creates holes in the components that have a diameter that is larger than the diameter of the shank, creating a space between the shank and the holes of the component. As the shank of the pitch diameter shank bolt has a smaller diameter than the shank of the full shank bolt, the pitch diameter shank bolt does not transfer shear as well as the full shank bolt.

SUMMARY OF THE INVENTION

A fastener according to an exemplary embodiment of this disclosure, among other possible things, includes a fastening portion including a head, a threaded portion having a first diameter, and a shank having a second diameter that is less than the first diameter. The shank is located between the head and the threaded portion. A sleeve surrounds the shank. The sleeve and the shank are uncoupled.

In a further embodiment of any of the foregoing fasteners, the sleeve includes a slot that extends through a body of the sleeve. The size of the slot is adjustable.

In a further embodiment of any of the foregoing fasteners, the sleeve is slotless.

In a further embodiment of any of the foregoing fasteners, the sleeve has an outer diameter. The outer diameter of the sleeve is approximately equal to the outer diameter of the threaded portion.

In a further embodiment of any of the foregoing fasteners, the sleeve includes an inner surface. A space is defined between the inner surface of the sleeve and the shank. The space is about 0.0005" to about 0.001"

In a further embodiment of any of the foregoing fasteners, the sleeve is press fit on the shank.

In a further embodiment of any of the foregoing fasteners, the sleeve moves relative to the shank.

In a further embodiment of any of the foregoing fasteners, the sleeve does not expand radially in use.

In a further embodiment of any of the foregoing fasteners, the shank is stretchable.

In a further embodiment of any of the foregoing fasteners, an inner surface of the sleeve includes threads.

In a further embodiment of any of the foregoing fasteners, the fastener and the sleeve are made of a common material.

A gas turbine engine according to an exemplary embodiment of this disclosure, among other possible things, includes a first flanged component including a first hole, a second flanged component including a second hole aligned with the first hole, and a fastener received in the first hole and the second hole. The fastener includes a fastening portion and a sleeve. The fastening portion includes a head, a threaded portion having a first diameter, and a shank having a second diameter that is less than the first diameter. The shank is located between the head and the threaded portion. The sleeve and the shank are uncoupled.

In a further embodiment of any of the foregoing gas turbine engines, the sleeve includes a slot that extends through a body of the sleeve. The size of the slot is adjustable.

In a further embodiment of any of the foregoing gas turbine engines, the sleeve is slotless.

In a further embodiment of any of the foregoing gas turbine engines, the sleeve has an outer diameter. The outer diameter of the sleeve is approximately equal to the outer diameter of the threaded portion.

In a further embodiment of any of the foregoing gas turbine engines, the sleeve includes an inner surface. A space is defined between the inner surface of the sleeve and the shank. The space is about 0.0005" to about 0.001."

In a further embodiment of any of the foregoing gas turbine engines, the sleeve is press fit on the shank.

In a further embodiment of any of the foregoing gas turbine engines, an inner surface of the sleeve includes threads.

In a further embodiment of any of the foregoing gas turbine engines, the sleeve moves relative to the shank.

In a further embodiment of any of the foregoing gas turbine engines, the fastener and the sleeve are made of a common material.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 illustrates a perspective view of two adjacent flanged components of the gas turbine engine;

FIG. 3 illustrates a cross-sectional side view of the two adjacent flanged components of the gas turbine engine taken along line 3-3 of FIG. 2;

FIG. 4 illustrates a prior art pitch diameter shank bolt;

FIG. 5 illustrates a prior art full shank bolt;

DETAILED DESCRIPTION OF THE PREFERRED EMBODIMENTS

Figure 1:
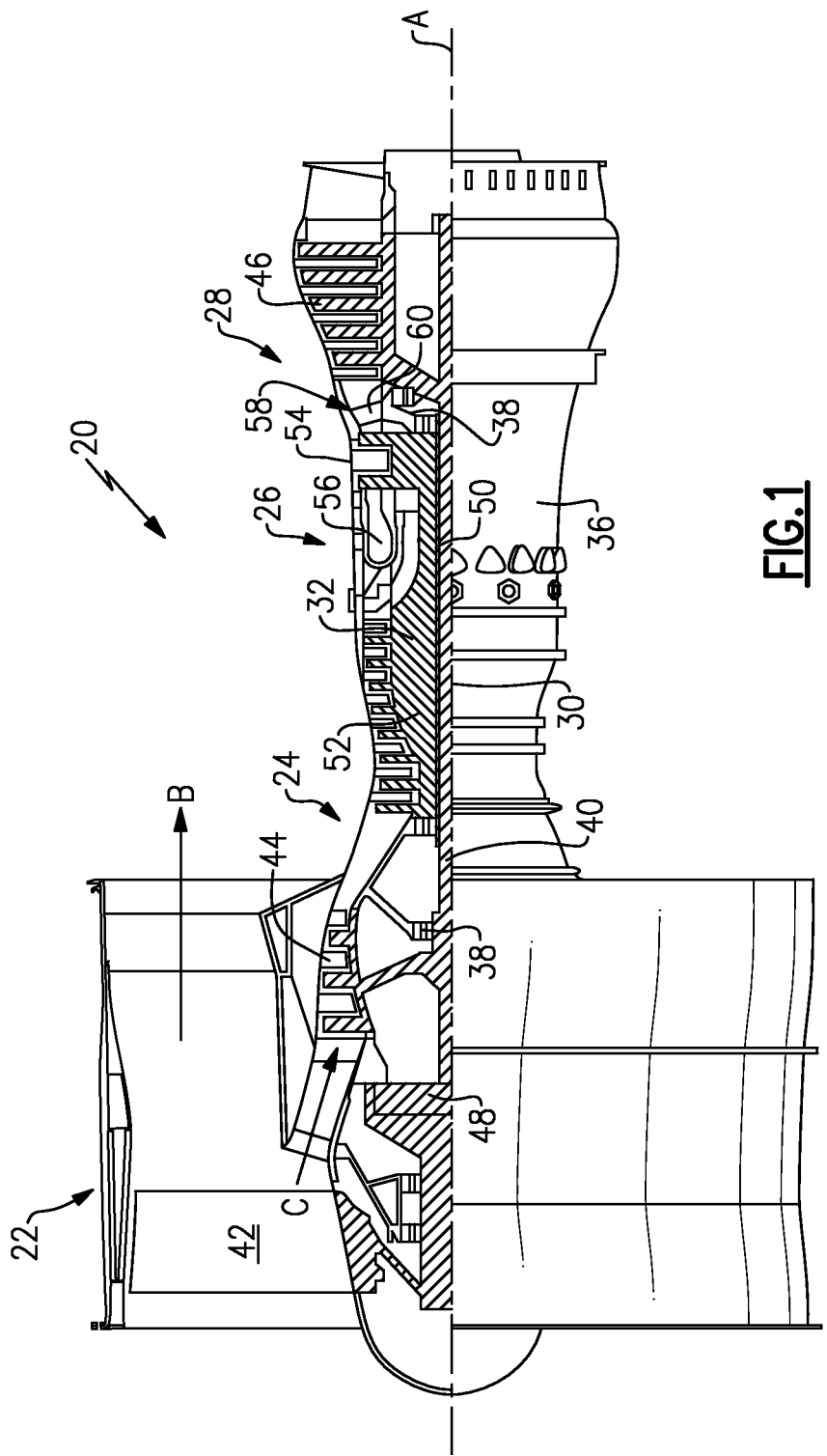
FIG. 1 illustrates a schematic view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A, which is collinear with their longitudinal axes.

The core airflow C is compressed by the low pressure compressor 44, then the high pressure compressor 52, mixed and burned with fuel in the combustor 56, then expanded over the high pressure turbine 54 and low pressure turbine 46. The mid-turbine frame 58 includes airfoils 60 which are in the core airflow path. The turbines 46, 54 rotationally drive the respective low speed spool 30 and high speed spool 32 in response to the expansion.

The gas turbine engine 20 is in one example a high-bypass geared aircraft engine. In a further example, the gas turbine engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

In one disclosed embodiment, the gas turbine engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet. The flight condition of 0.8 Mach and 35,000 feet, with the engine at its best fuel consumption, also known as bucket cruise Thrust Specific Fuel Consumption ("TSFC"). TSFC is the industry standard parameter of lbm of fuel being burned divided by lbf of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45.

"Low corrected fan tip speed" is the actual fan tip speed in feet per second divided by an industry standard temperature correction of $[(Tram\ °R)/518.7)^{0.5}]$. The "Low corrected fan tip speed" as disclosed herein according to one non-limiting embodiment is less than about 1150 feet per second (351 meters per second).

FIGS. 2 and 3 illustrate two flanged components 62 and 64 of the gas turbine engine 20. Each flanged component 62 and 64 includes a plurality of holes 66 and 68, respectively. In one example, the flanged components 62 and 64 extend circumferentially around the axial centerline A. One hole 66 of the flanged component 62 aligns with a hole 68 of the flanged component 64. A fastener 90 (shown in FIG. 6) is received in the aligned holes 66 and 68. In one example, the flanged component 62 is a static fan exit guide vane, and the flanged component 64 is a bulkhead, a fan case, or a forward center body. However, the flanged component 62 and 64 can be any component of a gas turbine engine 20 where stretch and shear occur. However, the components 62 and 64 can be used in any application where stretch and shear occur.

Figure 11:
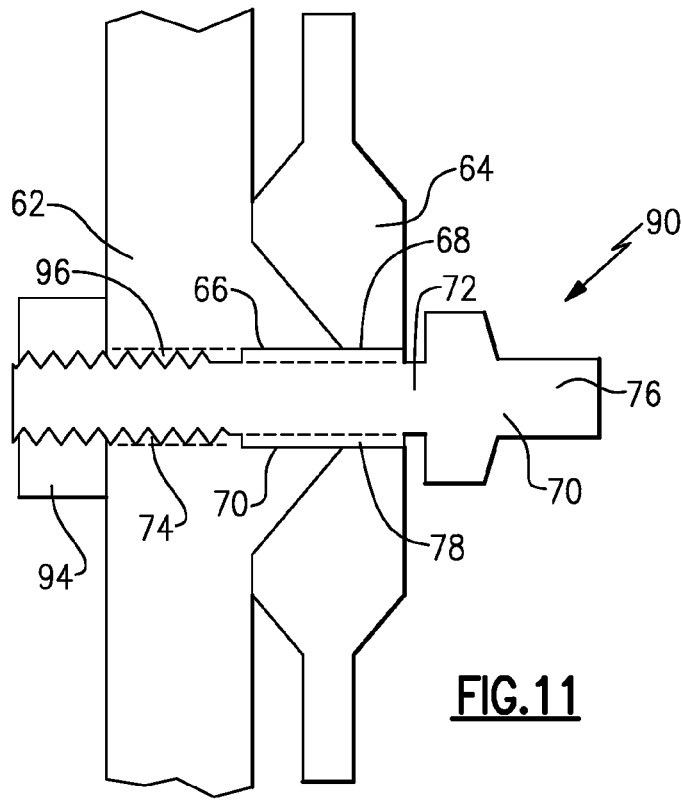
FIG. 11 illustrates a side view of the fastener of FIG. 6 securing two adjacent components together.

FIG. 4 illustrates a prior art pitch diameter shank bolt 70. The pitch diameter shank bolt 70 includes a shank 72 having a diameter X, a threaded portion 74 having an outer diameter Y, and a head 76. The shank 72 is located between the head 76 and the threaded portion 74. The outer diameter Y of the threaded portion 74 is greater than the diameter X of the shank 72. The pitch diameter shank bolt 70 provides for good stretch due to the diameter X of the shank 72. The pitch diameter shank bolt 70 is not as effective at providing shear, bending and joint rolling as the holes 66 and 68 are enlarged by the larger diameter Y threaded portion 74 during installation (an enlarged hole 96 is shown in FIG. 11). This creates a space between the shank 72 and the holes 66 and 68 of the flanged components 62 and 64, respectively.

FIG. 5 illustrates a prior art full shank bolt 77. The full shank bolt 77 includes a shank 80 having a diameter Z, a threaded portion 82 having an outer diameter Y, and a head 94. The shank 80 is located between the head 94 and the threaded portion 82. The outer diameter Y of the threaded portion 82 is less than the diameter Z of the shank 80. The thickness of the shank 80 provides the full shank bolt 77 with good shear, bending, and joint rolling. However, the full shank bolt 77 is not as effecting at providing stretch due to the diameter Z of the shank 80.

Figure 6:
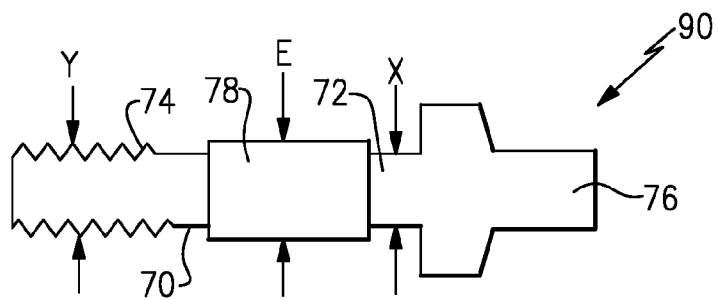
FIG. 6 illustrates a fastener including a pitch diameter shank bolt and a shear sleeve.

FIG. 6 illustrates a fastener 90 including the pitch diameter shank bolt 70 with a shear sleeve 78 located around and surrounding the shank 72 of the pitch diameter shank bolt 70. In one example, the pitch diameter shank bolt 70 is the pitch diameter shank bolt 70 of FIG. 3. In one example, the shear sleeve 78 is a hollow shear pin.

Figure 7:
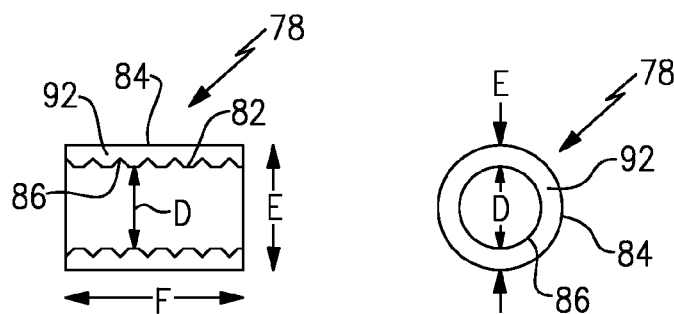
FIG. 7 illustrates a cross-sectional side view of the shear sleeve.
Figure 8:
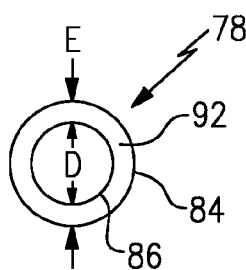
FIG. 8 illustrates a front view of the shear sleeve.

FIGS. 7 and 8 illustrate the shear sleeve 78. The shear sleeve 78 includes a body portion 92 having an inner surface 86 defining an inner diameter D and an outer surface 84 defining an outer diameter E. The outer diameter E is approximately equal to the outer diameter Y of the threaded portion 74 of the pitch diameter shank bolt 70. The inner surface 86 includes partial depth threads that define a threaded surface 82 that allow the pitch diameter shank bolt 70 to capture the shear sleeve 78.

In one example, a space 96 (not shown) is defined between the inner surface 86 of the shear sleeve 78 and the shank 72 of the pitch diameter shank bolt 70. In one example, the space is about 0.0005" (0.0127 mm) to about 0.001" (0.0254 mm). This distance provides a close tolerance to provide a fit that allows for good shear transfer. In another example, the shear sleeve 78 is press fit on the shank 72 of the pitch diameter shank bolt 70.

The shear sleeve 78 and the pitch diameter shank bolt 70 are not coupled to each other. That is, the shear sleeve 78 and the pitch diameter shank bolt 70 are uncoupled. The pitch diameter shank bolt 70 provides strength, and the shear sleeve 78 provides shear. As the shank 72 of the pitch diameter shank bolt 70 is not coupled to or attached to the shear sleeve 78, the shank 72 of the pitch diameter shank bolt 70 provides for elasticity and can stretch in the same manner as a typical pitch diameter shank bolt 70 without any restriction by the shear sleeve 78. The shear sleeve 78 provides additional width around the shank 72 to provide shear that accommodates for the increase in size of the holes 66 and 68 that result from the passage of the larger diameter threaded portion 74 when the fastener 90 is installed. As a result, the fastener 90 can transfer shear without sacrificing bolt strength. In use, the shear sleeve 78 does not expand radially.

In one example, the pitch diameter shank bolt 70 and the shear sleeve 78 are made of the same material. In one example, the pitch diameter shank bolt 70 and the shear sleeve 78 are made of Inconel®, a registered trademark of Inco Alloys International, Inc. of Huntington, W. Va.

Figure 9:
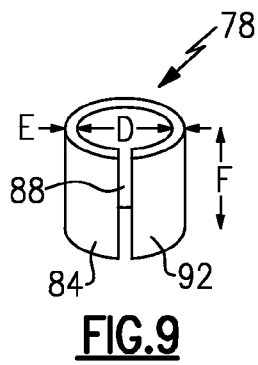
FIG. 9 illustrates a perspective view of the shear sleeve including a first example slot.
Figure 10:
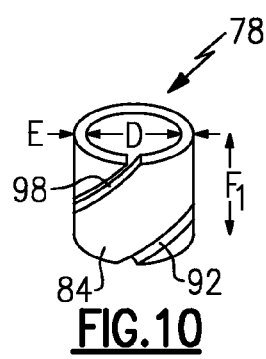
FIG. 10 illustrates a perspective view of the shear sleeve including a second example slot.

In one example shown in FIG. 9, the shear sleeve 78 includes a straight slot 88 that extends along a length F of the shear sleeve 78. In another example shown in FIG. 10, the shear sleeve 78 includes a curved slot 98. The slots 88 and 98 allow the shear sleeve 78 to be added to the shank 72 of the pitch diameter shank bolt 70 aftermarket. The material of the shear sleeve 78 is flexible and elastic enough such that the shear sleeve 78 can be stretched so that the slots 88 and 98 can be enlarged enough to allow that the shank 72 of the pitch diameter shank bolt 70 to pass through the slots 88 and 98 of the shear sleeve 78 and then return to the original size. That is, the size of the slots 88 and 98 is adjustable.

In another example, the shear sleeve 78 is added to the shank 72 of pitch diameter shank bolt 70 during manufacturing. In this example, the shear sleeve 78 does not include a slot.

FIG. 11 illustrates the two flanged components 62 and 64 secured together by the fastener 90. The fastener 90 is received in the holes 66 and 68 of the flanged components 62 and 64, respectively. A securing feature 94 is added to a portion of the threaded portion 74 that is exposed to secure the flanged components 62 and 64 together.

Although a gas turbine engine 20 including geared architecture 48 is described, the fastener 90 can be employed with a gas turbine engine without geared architecture.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A fastener comprising:
   a fastening portion including a head, a threaded portion having a first diameter, and a shank having a second diameter that is less than the first diameter, wherein the shank is located between the head and the threaded portion; and
   a sleeve surrounding the shank, wherein the sleeve and the shank are uncoupled, wherein an entirety of the sleeve is located between the head and the threaded portion and the sleeve is slidable relative to the shank of the fastener along a longitudinal axis of the shank, wherein the sleeve includes an inner surface, a space is defined between the inner surface of the sleeve and the shank, and the space is about 0.0005" to about 0.001".

2. The fastener as recited in claim 1 wherein the sleeve includes a slot that extends through a body of the sleeve, and a size of the slot is adjustable.

3. The fastener as recited in claim 1 wherein the sleeve is slotless.

4. The fastener as recited in claim 1 wherein the sleeve has an outer diameter, and the outer diameter of the sleeve is approximately equal to the outer diameter of the threaded portion.

5. The fastener as recited in claim 1 wherein the sleeve does not expand radially in use.

6. The fastener as recited in claim 1 wherein the shank is stretchable.

7. The fastener as recited in claim 1 wherein an inner surface of the sleeve includes threads.

8. The fastener as recited in claim 1 wherein the fastener and the sleeve are made of a common material.

9. The fastener as recited in claim 1 wherein the sleeve is substantially cylindrical and flangeless.

10. A gas turbine engine comprising:
    a first flanged component including a first hole;
    a second flanged component including a second hole aligned with the first hole; and
    a fastener received in the first hole and the second hole, wherein the fastener includes a fastening portion and a sleeve, and the fastening portion includes a head, a threaded portion having a first diameter, and a shank having a second diameter that is less than the first diameter, wherein the shank is located between the head and the threaded portion, and the sleeve and the shank are uncoupled, wherein an entirety of the sleeve is located between the head and the threaded portion and the sleeve is slidable relative to the shank of the fastener along a longitudinal axis of the shank, wherein the sleeve includes an inner surface, a space is defined between the inner surface of the sleeve and the shank, and the space is about 0.0005" to about 0.001".

11. The gas turbine engine as recited in claim 10 wherein the sleeve includes a slot that extends through a body of the sleeve, and a size of the slot is adjustable.

12. The gas turbine engine as recited in claim 10 wherein the sleeve is slotless.

13. The gas turbine engine as recited in claim 10 wherein the sleeve has an outer diameter, and the outer diameter of the sleeve is approximately equal to the outer diameter of the threaded portion.

14. The gas turbine engine as recited in claim 10 wherein an inner surface of the sleeve includes threads.

15. The gas turbine engine as recited in claim 10 wherein the fastener and the sleeve are made of a common material.

16. The gas turbine engine as recited in claim 10 wherein the first flanged component and the second flanged component are components of a gas turbine engine.

* * * * *